United States Patent
Song et al.

(10) Patent No.: US 11,902,158 B2
(45) Date of Patent: Feb. 13, 2024

(54) SYSTEM AND METHOD FOR FORWARDING PACKETS IN A HIERARCHICAL NETWORK ARCHITECTURE USING VARIABLE LENGTH ADDRESSES

(71) Applicant: HUAWEI TECHNOLOGIES CO., LTD., Shenzhen (CN)

(72) Inventors: Haoyu Song, San Jose, CA (US); Yingzhen Qu, San Jose, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/956,661

(22) Filed: Sep. 29, 2022

(65) Prior Publication Data

US 2023/0015347 A1  Jan. 19, 2023

Related U.S. Application Data

(63) Continuation of application No. PCT/US2020/028476, filed on Apr. 16, 2020.

(51) Int. Cl.
*H04L 45/74* (2022.01)
*H04L 45/02* (2022.01)
*H04L 45/00* (2022.01)

(52) U.S. Cl.
CPC ............. *H04L 45/74* (2013.01); *H04L 45/04* (2013.01); *H04L 45/566* (2013.01)

(58) Field of Classification Search
CPC ..... H04L 61/00; H04L 61/2596; H04L 61/59; H04L 45/74; H04L 45/04; H04L 45/566
See application file for complete search history.

(56) References Cited

U.S. PATENT DOCUMENTS 6,246,696 B1 * 6/2001 Yamaguchi ............... H04L 9/40
                                                    455/551
6,389,462 B1 * 5/2002 Cohen ................. H04L 67/1019
                                                    709/239

(Continued)

FOREIGN PATENT DOCUMENTS

CN      101557349 A    10/2009

OTHER PUBLICATIONS

International Search Report and Written Opinion dated Dec. 18, 2020, International Application No. PCT/US2020/028476.

(Continued)

*Primary Examiner* — Jonathan A Bui
(74) *Attorney, Agent, or Firm* — Vierra Magen Marcus LLP

(57) ABSTRACT

This disclosure relates to transmitting data packets from a source to a destination within a communications network. A data packet is received from the source located in a local sub-network of the network. The data packet includes a first network layer protocol header having a source address containing the local sub-network address of the source, a destination address of the destination, a first field indicating a length of the source address and a second field indicating a length of the destination address. The first network layer protocol header is transformed by modifying the source address and the first field indicating the length of the source address, such that the modifying includes appending to the local sub-network address a prefix of the sub-network to make the source address an address of a higher-level network. The data packet is then forwarded toward the destination in the higher-level network.

20 Claims, 8 Drawing Sheets

(56) References Cited

U.S. PATENT DOCUMENTS

| | | | | |
|---|---|---|---|---|
| 2003/0128699 | A1* | 7/2003 | Reams | H04L 67/14 |
| | | | | 370/389 |
| 2003/0152092 | A1* | 8/2003 | Lu | H04L 45/54 |
| | | | | 370/408 |
| 2008/0186851 | A1* | 8/2008 | Quinn | H04L 47/41 |
| | | | | 370/468 |
| 2013/0223345 | A1* | 8/2013 | Asterjadhi | H04W 28/06 |
| | | | | 370/328 |
| 2017/0237658 | A1* | 8/2017 | Roberts | H04L 45/48 |
| | | | | 370/392 |

OTHER PUBLICATIONS

Hickman, Christopher et al., "A Variable Length Address Assignment Scheme for 6LoWPAN," 2019 IEEE 20th International Symposium on "A World of Wireless, Mobile and Multimedia Networks" (WoWMoM), Jun. 10, 2019, pp. 1-6.

Ramakrishnaiah, Nagendla et al., "Tree Based Variable Length Address Autoconfiguration Protocol for Mobile Ad Hoc Networks," 2016 2nd International Conference on Advances in Computing, Communication, & Automation (ICACCA), Sep. 30, 2016, pp. 1-6.

Bryant, S. et al., "Forwarding Layer Problem Statement; draft-bryant-arch-fwd-layer-ps-00.txt", Mar. 9, 2020, pp. 1-45.

International Preliminary Report on Patentability dated Oct. 27, 2022, International Application No. PCT/US2020/028476.

Office Action dated Dec. 20, 2023, Chinese Patent Application No. 202080099884.4, 41 pages.

* cited by examiner

| Subnet | Length (bytes) | Prefix to Upper Level Subnet |
|---|---|---|
| 503 | 4 | 2001::/96 |
| 505 | 2 | 0xaaaa/16 |
| 507 | 1 | 0xbb/8 |
| 509 | 1 | 0xcccccc/24 |

| Host | Subnet | Address in Subnet |
|---|---|---|
| x | 505 | 0x0001 |
| y | 505 | 0x0002 |
| z | 507 | 0x01 |
| m | 503 | 0x00000001 |
| n | 509 | 0x01 |

SYSTEM AND METHOD FOR FORWARDING PACKETS IN A HIERARCHICAL NETWORK ARCHITECTURE USING VARIABLE LENGTH ADDRESSES

CLAIM OF PRIORITY

This application is a continuation of and claims the benefit of priority to International Application Serial No. PCT/US2020/028476, filed Apr. 16, 2020, the entire contents of which is hereby incorporated by reference.

FIELD

The disclosure generally relates to routing data packets in a network using variable length addressing.

BACKGROUND

An Internet Protocol (IP) address is used to identify devices and provide locations of the devices in the IP network. For example, an IP header includes a source address identifying a source device and a destination address identifying a destination device in the IP network. The IP network can determine a path for the IP packet to be transmitted from the source device to the destination device based on the source IP address and the destination IP address. With the continued development of the Internet, conventional IP addressing (e.g., IPv4 and IPv6) is facing increasing issues, such as address exhaustion and low packet efficiency in the Internet of Things (IoT). For example, in IoT, machine-to-machine or thing-to-thing communication through wireless connections is dominant. Such communications tend to be chatty, with frequent short message exchanges that are energy sensitive and require low latency. This type of communication is not conducive to the conventional IP addressing mechanisms, which utilize fixed addressing lengths that render large overhead and waste useful resources, power and increase processing time.

BRIEF SUMMARY

According to one aspect of the present disclosure, there is a method for transmitting data packets from a source to a destination within a communications network, comprising receiving a data packet from the source located in a local sub-network of the network, the data packet including a first network layer protocol header having a source address containing a local sub-network address of the source, a destination address of the destination, a first field indicating a length of the source address and a second field indicating a length of the destination address; transforming the first network layer protocol header by modifying the source address and the first field indicating the length of the source address, the modifying including appending to the local sub-network address a prefix of the sub-network to make the source address an address of a higher level network; and forwarding the data packet, including the transformed local-sub-network address, toward the destination in the higher level network.

Optionally, in any of the preceding aspects, the method further comprising receiving a second data packet with a second local sub-network address of a second source and a second destination address in a second network layer protocol header; transforming the second network layer protocol header by modifying the second destination address and a third field indicating the length of the second destination address, the modifying including removing from the second destination address a prefix of the higher level network; and forwarding the second data packet, including the transformed destination address, toward the second destination address.

Optionally, in any of the preceding aspects, the first data packet and the second data packet are the same data packet.

Optionally, in any of the preceding aspects, the method further comprising determining the destination is located outside of the local sub-network of the source when the length of the source address indicated by the first field is less than the length of the destination address indicated by the second field, wherein the transforming and forwarding are in response to the determining.

Optionally, in any of the preceding aspects, the modifying further comprises modifying at least one of the first field indicating the length of the source address and the second field indicating the length of the destination address.

Optionally, in any of the preceding aspects, communications network includes a plurality of sources and destinations arranged in a nested hierarchical sub-network structure.

Optionally, in any of the preceding aspects, the source address is a local sub-network address used to forward the data packet to the destination address.

Optionally, in any of the preceding aspects, the first field indicating the length of the source address and the second field indicating the length of the destination address are a fixed length.

According to one other aspect of the present disclosure, there is provided a router for transmitting data packets from a source to a destination within a communications network, comprising a non-transitory memory storage comprising instructions; and one or more processors in communication with the memory and the one or more sensors, wherein the one or more processors execute the instructions to receive a data packet from the source located in a local sub-network of the network, the data packet including a first network layer protocol header having a source address containing the local sub-network address of the source, a destination address of the destination, a first field indicating a length of the source address and a second field indicating a length of the destination address; transform the network layer protocol header by modifying the source address and the first field indicating the length of the source address, the modifying including appending to the local sub-network address a prefix of the sub-network to make the source address an address of a higher level network, including the transformed local-sub-network address, toward the destination in the higher level network.

Optionally, in any of the preceding aspects, the one or more processors further execute the instructions to: receive a second data packet with a second local sub-network address of a second source and a second destination address in a second network layer protocol header; transform the second network layer protocol header by modifying the second destination address and a third field indicating the length of the second destination address, the modifying including removing from the second destination address a prefix of the higher level network; and forward the second data packet, including the transformed destination address, toward the second destination address in the higher level network.

Optionally, in any of the preceding aspects, the first data packet and the second data packet are the same data packet.

Optionally, in any of the preceding aspects, the one or more processors further execute the instructions to determine the destination is located outside of the local sub-network of the source when the length of the source address indicated by the first field is less than the length of the destination address indicated by the second field, wherein the transform and forward steps are in response to the determine step.

Optionally, in any of the preceding aspects, the communications network includes a plurality of sources and destinations arranged in a nested hierarchical sub-network structure.

Optionally, in any of the preceding aspects, the source and destination addresses of each device is one of statically or dynamically configured.

Optionally, in any of the preceding aspects, the source address is a local sub-network address used to forward the data packet to the destination address.

Optionally, in any of the preceding aspects, the first field indicating the length of the source address and the second field indicating the length of the destination address are each a fixed length.

According to still one other aspect of the present disclosure, there is a non-transitory computer-readable medium storing computer instructions for transmitting data packets from a source to a destination within a communications network, that when executed by one or more processors, cause the one or more processors to perform the steps of receiving a data packet from the source located in a local sub-network of the network, the data packet including a first network layer protocol header having a source address containing the local sub-network address of the source, a destination address of the destination, a first field indicating a length of the source address and a second field indicating a length of the destination address; transforming the first network layer protocol header by modifying the source address and the first field indicating the length of the source address, the modifying including appending to the local sub-network address a prefix of the sub-network to make the source address an address of a higher level network; and forwarding the data packet, including the transformed local-sub-network address, toward the destination in the higher level network.

Optionally, in any of the preceding aspects, the non-transitory computer-readable medium includes instructions which cause the one or more processors to further perform the steps of: receiving a second data packet with a second local sub-network address of a second source and a second destination address in a second network layer protocol header; transforming the second network layer protocol header by modifying the second destination address and a third field indicating the length of the second destination address, the modifying including removing from the second destination address a prefix of the higher level network; and forwarding the second data packet, including the transformed destination address, toward the second destination address.

Optionally, in any of the preceding aspects, the first data packet and the second data packet are the same data packet.

Optionally, in any of the preceding aspects, the non-transitory computer-readable medium includes instructions which cause the one or more processors to further perform the step of determining the destination is located outside of the local sub-network of the source when the length of the source address indicated by the first field is less than the length of the destination address indicated by the second field, wherein the transforming and forwarding steps are in response to the determining step.

Optionally, in any of the preceding aspects, the modifying further comprises modifying at least one of the first field indicating the length of the source address and the second field indicating the length of the destination address.

Optionally, in any of the preceding aspects the communications network includes a plurality of sources and destinations arranged in a nested hierarchical sub-network structure.

Optionally, in any of the preceding aspects the source address is a local sub-network address used to forward the data packet to the destination address.

Optionally, in any of the preceding aspects the first field indicating the length of the source address and the second field indicating the length of the destination address are a fixed length.

According to yet another aspect of the present disclosure, there is a network layer protocol header, comprising a first field including a length of a source address (SAL); a second field including a length of a destination address (DAL); a third field including a variable length source address field, wherein the variable length is defined by the SAL; and a fourth field include a variable length destination address field, wherein the variable length is defined by the DAL.

According to still another aspect of the present disclosure, there is a method for transmitting data packets from a source to a destination within a communications network, comprising receiving a data packet from the source located in a sub-network of the network, the data packet including a network layer protocol header having a source address containing a local sub-network address of the source, a destination address of the destination, a length of the source address and a length of the destination address; transforming the destination address to an address in a next level sub-network by modifying the destination address and the length of the destination address, the modifying includes removing from the destination address a prefix of a lower level parent-subnetwork appended to the local sub-network address; and forwarding the data packet, including the transformed local-sub-network address, toward the destination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to technology for establishing a trusted relationship in a distributed system.

The disclosure generally relates to routing data packets in a network using variable length addressing.

Conventional address schemes, such as IPv4 and IPv6, use a fixed length address that limit the number of addressable devices, consume large amounts of overhead, increase processing time and waste resources and power. This disclosure introduces a packet header (e.g., a network layer protocol header, such as a layer 3 protocol header) that supports variable length addressing for use as a next generation Internet protocol, which extends the address length and increases processing time without wasting resources and power. Entities in a network are arranged into hierarchical sub-networks. The packet header includes, among other fields, a source address length and a destination address length that determines the length of the source address and the length of a destination address, respectively. As data packets traverse a path in a network from one entity to another entity in different sub-networks, the packet header is transformed by routers to modify the source address and the source address length, or the destination address and the destination address length. If the entities communicating are in the same sub-network, the local source address of each entity may be used without any transformation.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
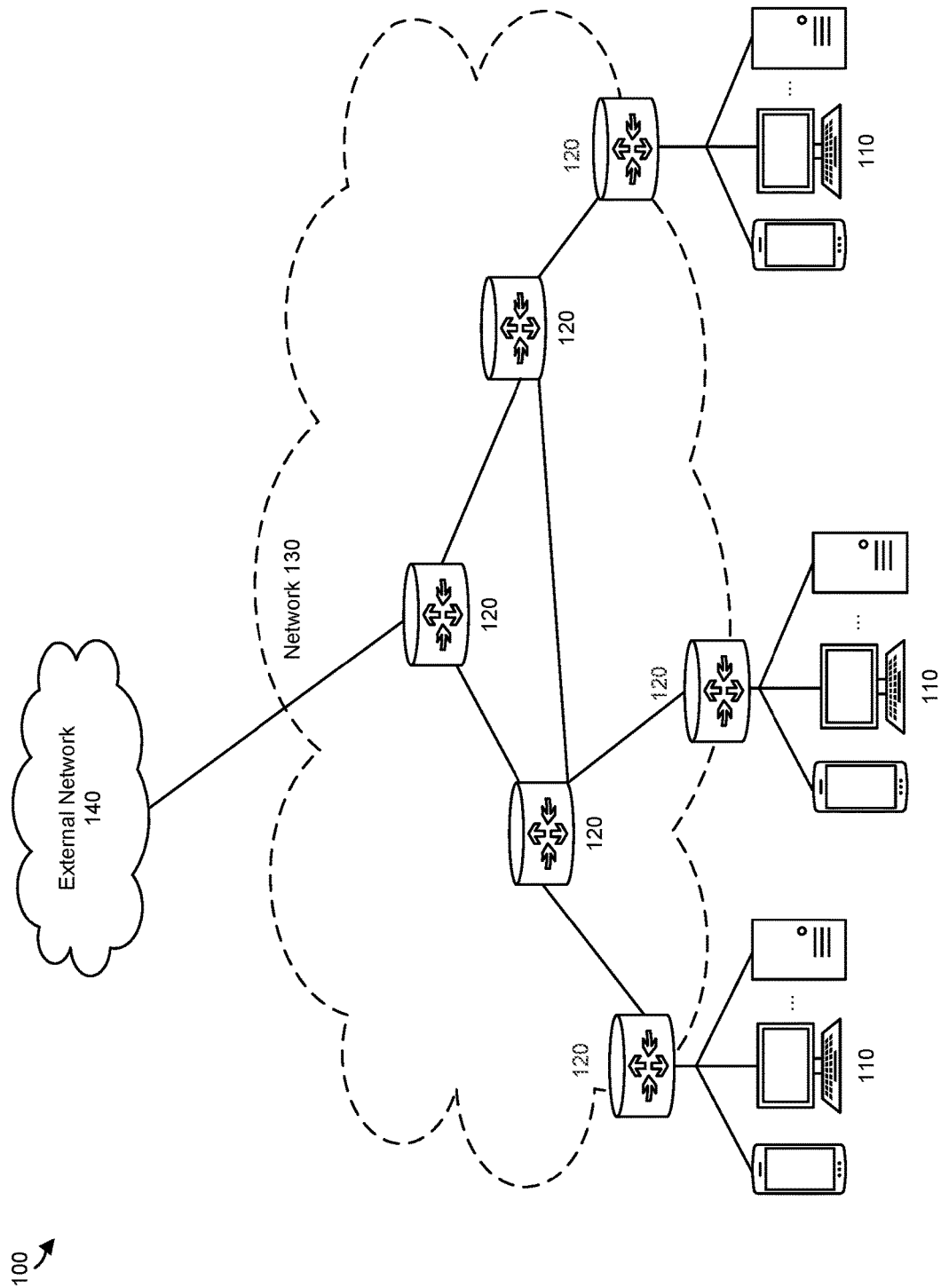
FIG. 1 illustrates an example system in which embodiments of the disclosure may be implemented.

FIG. 1 illustrates an example system in which embodiments of the disclosure may be implemented. System 100 includes computing devices 110, as well as network nodes 120, connected via network 130. In one embodiment, the system 100 is a distributed system in which the computing devices 110 and/or network nodes 120 include a trusted execution environment (TEE), as will be explained below. Although particular components of the system 100 are shown in FIG. 1, the system 100 is not limited to such components and may also include additional and/or different components. For example, in certain examples, the system 100 can include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

Networks 130 may be wired or wireless and include public networks or private networks including, but not limited to local area networks (LAN), wide area networks (WANs), satellite networks, cable networks, WiMaX networks, and communication networks, such as LTE and 5G networks. As shown in FIG. 1, network 130 can include one or more network nodes 120 that interconnect multiple computing devices 110, and connect computing devices 110 to external network 140, e.g., the Internet or an intranet. For example, network nodes 120 may include any number of different devices that facilitate network communications, such as servers, switches, routers, hubs, gateways, access points, firewalls, base stations, repeaters, backbone devices, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 110. In the illustrated example, each of the host sets 110 is operatively coupled to a corresponding network node, which are commonly referred to as "top-of-rack" or "TOR" network nodes. TOR network nodes 120 can then be operatively coupled to additional network nodes 120 to form a computer network in a hierarchical, flat, mesh, or other suitable types of topology that allows communications between computing devices 110 and external network 140. In other examples, multiple host sets 110 may share a single network node 120.

Computing devices 110 may be virtually any type of general- or specific-purpose computing device. For example, these computing devices may be user devices such as desktop computers, laptop computers, tablet computers, display devices, cameras, printers, Internet of Things (IoT) device, wearable computing devices, mobile devices or smartphones. However, in a data center environment, these computing devices may be server devices such as application server computers, virtual computing host computers, or file server computers. Moreover, computing devices 110 may be individually configured to provide computing, storage, and/or other suitable computing services.

Figure 2:
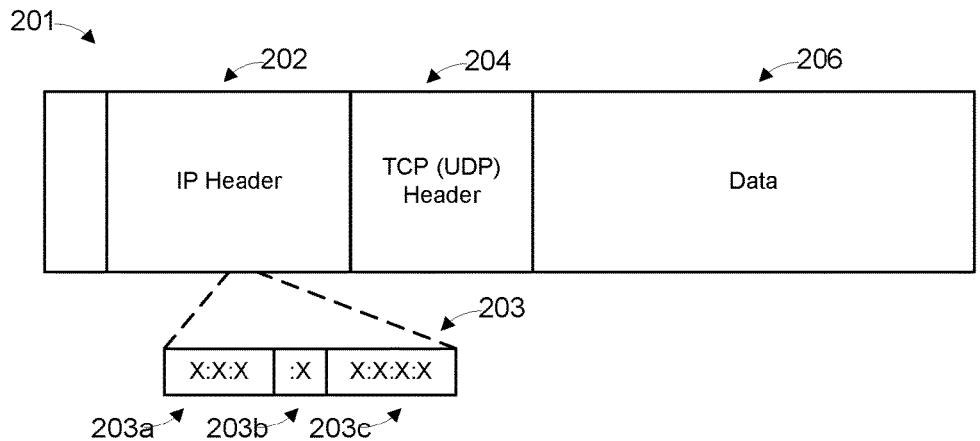
FIG. 2 illustrates an Internet Protocol (IP) packet used to route information in the network of FIG. 1.

FIG. 2 illustrates an Internet Protocol (IP) packet used to route information in the network of FIG. 1. In one embodiment, the IP packet 201 may include but is not limited to an IP header 202, a transmission control protocol (TCP) user datagram protocol (UDP) header (a TCP (UDP) header) and data (payload). The IP header 202 is a prefix of the IP packet 201 that contains information about the IP version, length of the packet, source and destination addresses, etc. as described below with reference to FIG. 3. In an IP header for IPv6, the address 203 is 128 bits in length and consists of eight, 16-bit fields, with each field bounded by a colon. Each field contains a hexadecimal number, in contrast to the dotted-decimal notation of IPv4 addresses. The address 203 includes a prefix 203a, a subnet ID 203b and an interface ID 203c, where the X's represent hexadecimal numbers. For example address 203 may be expressed as 2001:0db8:3c4d: 0015:0000:0000:1a2f:1a2b.

In the example, the leftmost three fields (48 bits) contain the prefix 203a. The prefix describes the public topology that is usually allocated to a site by an Internet Service Provider (ISP) or Regional Internet Registry (RIR). The next field is the 16-bit subnet ID 203*b*, which is allocated for the address. The subnet ID describes the private topology, also known as the site topology. The rightmost four fields (64 bits) contain the interface ID 203*c*, also referred to as a token. The interface ID 203*c* is either automatically configured from the interface's MAC address or manually configured in EUI-64 format. Thus, in the example, the address 203 shows all 128 bits of an IPv6 address, where the first 48 bits, 2001:0db8: 3c4d, contain the site prefix, representing the public topology. The next 16 bits, 0015, contain the subnet ID, representing the private topology for the site. The lower order, rightmost 64 bits, 0000:0000:1a2f:1a2b, contain the interface ID.

Figure 3:
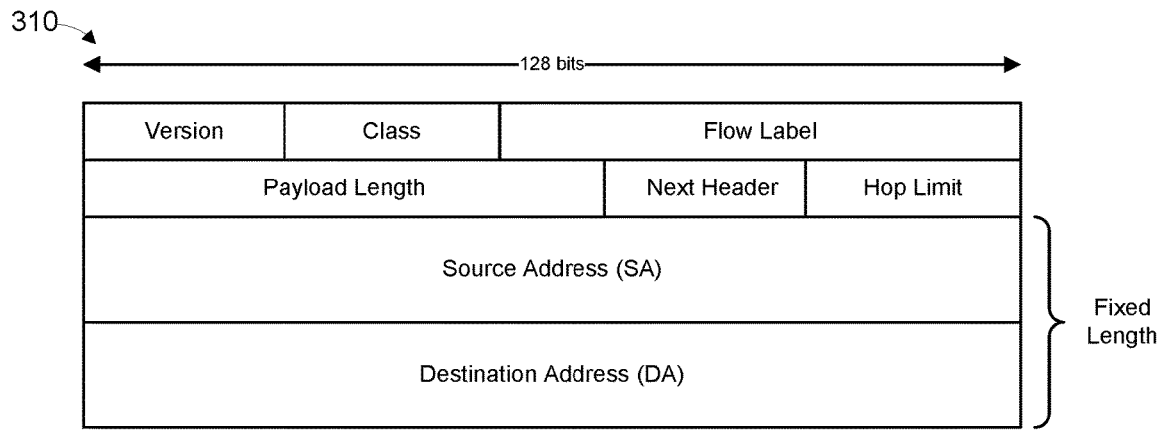
FIG. 3 illustrates a conventional IPv6 header format.

FIG. 3 illustrates a conventional IPv6 header format. As illustrated, the first field of the header 310 is the version number that defines the version of the Internet Protocol and includes four bits. The next field of the header 310 is the traffic class that includes 8 bits and is used for traffic management. Following the traffic class is a flow label field that is 20 bits in length and is used by a source to label sequences of packets to be treated as a single packet. The next field of the header 310 is a payload length, which is a 16 bit segment. The payload length is followed by the next header field having a length of 8 bits, followed by the hop limit field that includes eight bits. The next header field identifies the immediate next type of header, and the hop limit is decremented by 1 until reaching 0. Thus, the portion of the header 310 leading up to the address fields comprises one hundred sixty bits (160) of information.

Following the initial portion of the header 310, the IPv6 header format includes a source address (SA) which has a length of one hundred twenty eight (128) bits. Likewise, the destination address (DA) is also a one hundred twenty eight bit (128) address. Both the source address and the destination address are a fixed length. The IPv6 header format expands both the source address and the destination address to a one hundred twenty eight bit address as compared to the IPv4 format in which both the source address and the destination address are thirty-two bit sections. As can be understood in the figure, the entire header 310 in the IPv6 format is forty octets in length and precedes the information payload that is transmitted over the Internet.

As appreciated, a fixed address length (as in both IPv4 and IPv6) defines a monolithic address space in which each entity or device is assigned a flat address as its global identifier, which is used to communicate with other entities and devices. In order to prevent address exhaustion (i.e., running out of addresses), one technique is to migrate to a larger address space and reassigning longer addresses to the entities and devices. Naturally, introducing such a process results in service disruption and delay due to necessary application, protocol stack and global network updates.

Figure 4:
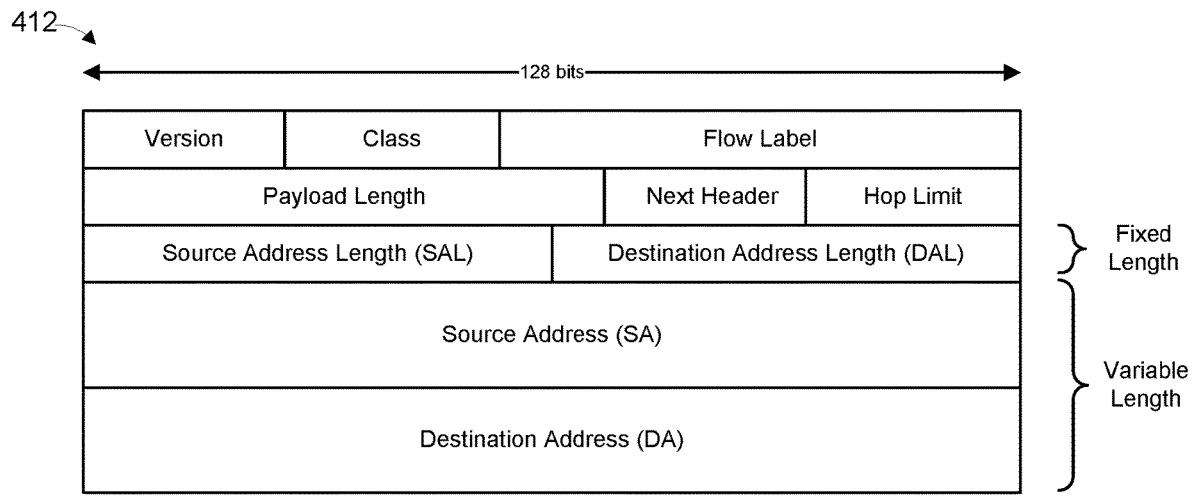
FIG. 4 illustrates an example network layer protocol header format in accordance with embodiments of the disclosure.

FIG. 4 illustrates an example network layer protocol header format in accordance with embodiments of the disclosure. The network protocol layer header (e.g., hereinafter referred to as "packet header" or "IP header" or "IPvn header" for next generation IP protocol) header is introduced to address issues, such as address exhaustion, associated with a fixed addressing scheme, such as those described above with reference to IPv6. In one embodiment, the IPvn header has a variable length address (lengthen or shorten the address) in which the base address may remain unchanged, while expanding the address space itself. The IPvn header 412 is similar to the IPv6 header 310 with the following primary exceptions—the IPvn header 412 includes the additional fields source address length (SAL) and destination address length (DAL), and the source address (SA) and destination address (DA) are variable in length. These two additional fields represent an updated packet header that supports variable length addresses such that entities (devices) can use the shortest address length for communicating, as will be explained in detail below.

Figure 5:
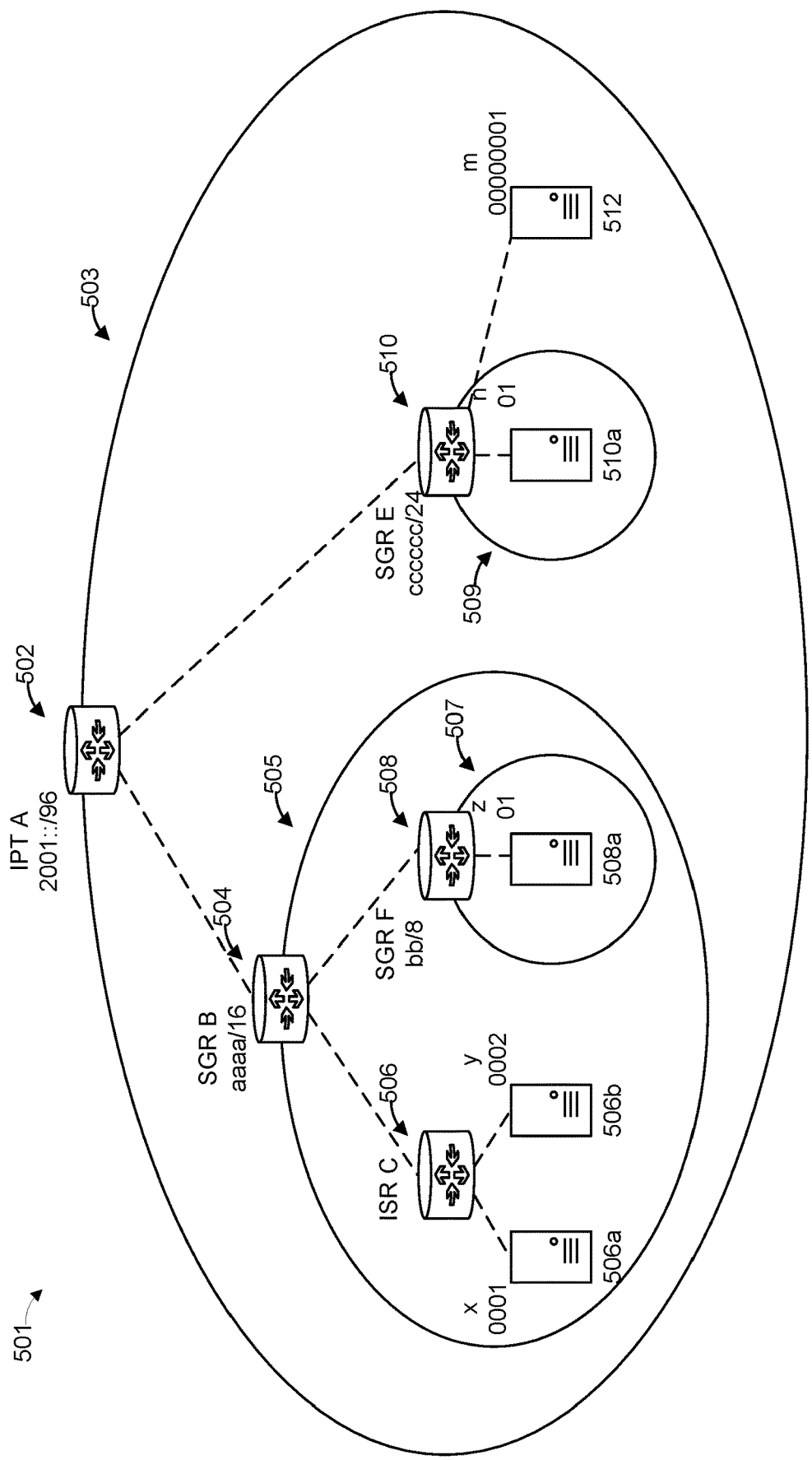
FIG. 5 illustrates an example hierarchical network and corresponding address scheme in accordance with the disclosed embodiments.

FIG. 5 illustrates an example hierarchical network and corresponding address scheme in accordance with the disclosed embodiments. The hierarchical network 501 is based on a hierarchical tree structure of domains that organizes the network, including devices such as routers and computing devices. Each domain may have zero or more associated devices. The network may include one or more domains, which domains may be used to define the structure of an entity or a group of entities. Multiple domains may help separate large, geographically distant portions of an entity into smaller, more manageable sections, and to control administrative access to individual sections. For example, a small entity may include a single domain for their entire network. A large, international entity, on the other hand, might have dozens of domains to represent each of its regional networks across the world. The domains, in this situation, may be arranged in a hierarchical tree structure similar to the structure of the entity As defined herein, the term entity may be any network addressable device. In one embodiment, an entity uses a global address (or globally unique ID) to communicate with other entities in the network. Such a global address is identifiable to every other entity in the network. This allows entities to communicate with each other across different networks or sub-networks. However, entities in the same network or sub-network need not use a full address to communicate with each other since they share the same sub-network prefix. Rather, the entities may use a local address (e.g., the global address suffix) to communicate with each other in the same network or sub-network. As will be explained in the discussion that follows, the entity may use its local address as the source address, which may be transformed in such a manner that the destination entity may be located, even in a different sub-network.

In one embodiment, entities are grouped into sub-networks based on criteria, such as geographic location, ownership and logical relationships. If each sub-network is grouped to a higher level sub-network in a similar fashion, a hierarchical network is formed in which addresses as short as possible may be used for communication. For example, if a sub-network contains less than 256 entities, an 8-bit local address is sufficient to differentiate each of the entities. When entities need to communicate with each other, their local addresses may be used. In this case, since each of the entities share a same prefix, the prefix may be appended (added) to the local address to provide a uniquely addressable entity in the next higher level sub-network.

In operation, an entity uses addresses in the lowest level sub-network to which it belongs. When an entity (e.g., source entity) communicates with another entity (e.g., destination entity) in the same sub-network, the local addresses of the source and destination entities associated with the same sub-network may be used. In this case, a data packet may be forwarded from the source entity to the destination entity via an Intra-Subnet Router (ISR). As the name implies, an ISR handles intra-subnetwork forwarding. In one embodiment, the address of the entity in the sub-network is statically configured. In another embodiment, the address of the entity in the sub-network is dynamically configured (e.g., DHCP). A detailed explanation is provided below with reference to the various figures.

In another embodiment, when a source entity communicates with a destination entity outside of the current sub-network (i.e., the source and destination entities are in different sub-networks), the source entity acquires the destination entity's "global" address (destination address), which is the full address of the entity in their common lowest level sub-network. A global address has a relative meaning between two communicating entities (e.g., the shortest address that an entity can be uniquely identified by another entity). That is, the address of the sub-network that contains both of the sub-networks of the two entities communicating is the shortest address to be uniquely identified. In this case, a sub-network gateway router (SGR) of the sub-network stores the prefix of the sub-network in a forwarding table that can be used to transform a local address (recognizable within a sub-network) into a global address (recognizable outside of the local sub-network). In one embodiment, the SGR is a gateway router that is located at a border of the sub-network. A detailed explanation is provided below with reference to the various figures.

As illustrated, the hierarchical network 501 is nested and includes a total of four sub-networks (subnets) 503, 505, 507, 509. Each sub-network 503, 505, 507, 509 has a corresponding gateway router 502, 504, 508, 510, respectively, and may have additional routers, such as router 506. Computing devices 506a, 506b, 508a, 510a and 512 are each communicatively coupled to a respective router. In one embodiment, the computing devices 506a, 506b, 508a, 510a and 512 are computing devices 110 of FIG. 1.

A sub-network can include multiple sub-networks, each sub-network can be a different size. For two entities in the same lowest level sub-network (i.e., no more sub-network divisions in the sub-network), the entities local addresses in the sub-network are global to each other (each entity can uniquely identify the other entity with the shortest address (in this case, the local address)). That is, an entity only needs to know its local address in its immediate sub-network. For two entities in different sub-networks, their lowest common parent sub-network (i.e., the sub-network that contains the two sub-networks of the two entities and has the shortest address) are global to each other.

In one embodiment, each sub-network has one or more SGRs which are responsible for forwarding packets in or out of the sub-network. Within a sub-network, ISRs are responsible for intra-subnet packet forwarding. During the packet forwarding process, and for purposes of discussion, it is assumed that the source address and the destination address are known. The address related fields in the IP header are modified in the network by SGRs. To accomplish this, an SGR of a sub-network stores a prefix that can be appended to the source address from the sub-network to an address in the next higher level subnet, as explained below. If an SGR needs to forward an internal packet outside of the sub-network, the source address is appended with the prefix and the corresponding source address length is updated. Conversely, if an SGR receives a data packet destined for the local sub-network from outside (i.e., the sub-network prefix matches the destination address), the sub-network prefix is removed from the data packet destination address and the destination address length is updated. In contrast, the ISR does not modify the address fields. Rather, an ISR can decide the packet forwarding direction by simply comparing its source address length to its destination address length, as a destination address longer than a source address can indicate that the packet needs to be forwarded to a higher-level sub-network without needing to review the contents of the destination address. The packet may then be forwarded to a higher or lower-level sub-network depending on the comparison, as explained further below.

For example, each sub-network 503, 505, 507, 509 has an address space. Sub-network 502 has a 32-bit address space and two lower level sub-networks (sub-networks 505 and 509, and entity 512 ('m')). Sub-network 505 has a 16-bit address space and includes entity 506a ('x'), entity 506b ('y') and sub-network 507. Sub-network 507 (including entity 508a ('z')) and sub-network 509 ('n') each have an 8-bit address space. For purposes of the discussion that follows, the entity addresses and sub-network prefixes are labeled in the hierarchical network 501, as shown.

In the example of FIG. 5, entities 506a and 506b are in a same sub-network. Thus, to communicate, their local addresses (i.e., addresses "0001" and "0002") in sub-network 505 may be used as their global addresses. For entities in different sub-networks, such as entities 506a and 508a, the local addresses are insufficient for communication. To communicate, the addresses are transformed (modified) to include a lowest level common sub-network. For example, entity 506a is in sub-network 505 and entity 508a is in sub-network 507. For the entities 506a and 508a to communicate, the local address of entity 508a ("0x01") is appended (or augmented) with its sub-network prefix "0xbb" (the prefix of sub-network 507 ("SGR F") to become a global address ("0xbb01").

In another example, for entity 508a to communicate with entity 510a ('n'), their global addresses in sub-network 503 are required. That is, entity 508a is uniquely identified by entity 510a with the address "0xaaaabb01" and entity 510a is uniquely identified by entity 508a with the address "0xcccccc01." If entity 508a needs to send a packet to entity 510a, entity 508a must first acquire the "global" address of entity 510a ("0xcccccc01"). However, entity 508a is only aware of its own local address "0x01", and uses that as the source address in the packet. Storing these addresses in the IP header of a data packet forwarded to router 508, the source address is appended with the prefix "0xbb" of the sub-network 507 of router 508. The data packet is forwarded to 504, which further appends the source address with the prefix "0xaaaa" (the address of the sub-network 505 of router 504). At router 504, the source address and the destination address have the same length, which means that the two entities are in their lowest level common subnet. The packet may then be forwarded in this sub-network to reach router 510 of sub-network 509. Before forwarding the packet, router 510 will remove (or prune) the prefix "0xcccccc" from the destination address. The remaining address, "0x01," is now sufficient to uniquely identify entity 510a in sub-network 509.

The details of the transformation will be described below in more detail with reference to the various figures.

Using these applied techniques, there is no need for an entity to know its immediate sub-network's prefix and for a sub-network to know the prefix of the next higher level sub-network. Rather, such information may be stored in the immediate sub-network gateway router. The entity itself simply maintains the local address in its immediate sub-network. Moreover, if address exhaustion occurs (address expansion becomes necessary), another level of sub-network can be added while existing sub-networks and their respective addresses remain unaffected.

Figures 6, 8A, 8B:
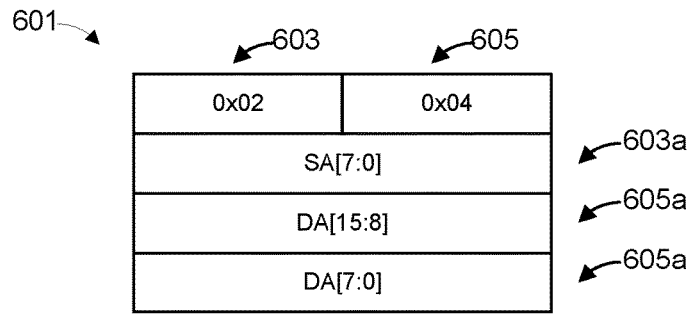
FIG. 6 illustrates an example of an IPvn header in accordance with the embodiment of FIG. 4.
FIGS. 8A and 8B illustrates example forwarding tables for routing data packets in the network of FIG. 5.

FIG. 6 illustrates an example of an IP header related address fields in accordance with embodiments of the disclosure. The related address fields 601 of the IP header (e.g., IP header 412 in FIG. 4) includes a source address length (SAL) 603, a destination address length (DAL) 605, a source address (SA) 603a and a destination address (DA) 605a. The length of the source address 603a is indicated by the SAL 603 and the length of the destination address 605a is indicated by the DAL 605. In one embodiment, the SAL 603 and DAL 605 are fixed in length. The source address 603a and destination address 605a are variable in length as dictated by the SAL 603 and DAL 605, respectively.

In the non-limiting example that follows, it is assumed for purposes of discussion that all fields are byte-aligned. However, it is appreciated that length of address may be in bytes, bits, nibbles (half-bytes) or any other known unit of length. Using the length in bytes may beneficially reduce the size of the SAL and DAL, but may result in a coarse subnet granularity which may be inefficient in address allocation. For example, 4-bit SAL and DAL are sufficient to encode 16 address lengths (up to 16 bytes) for sub-networks by using their equivalent decimal value (i.e., "0b0000" is 16). Applying this unit of length, each next higher level sub-network is at least 256 times larger. Using the length in bits, on the other hand, beneficially allows finer sub-network granularity, but requires more space for the SAL and DAL. For example, an 8-bit SAL and DAL can support up to 256-bit address and the next higher level sub-network can only be twice as large.

In either embodiment, the IP header overhead is substantially reduced using this addressing scheme. For example, for communications between entities 506a and 506b (FIG. 5), the total address related IP header overhead is at most 6 bytes (24 bits). This is in contrast to 8 bytes (32 bits) required for IPv4 and 32 bytes (128 bits) required for IPv6. For local communications, e.g. those within the same sub-network, savings can directly translate into resource, energy and latency gains. For communications outside of the local sub-network, the overhead savings remain sizable due to in-network address manipulation.

Figure 7A:
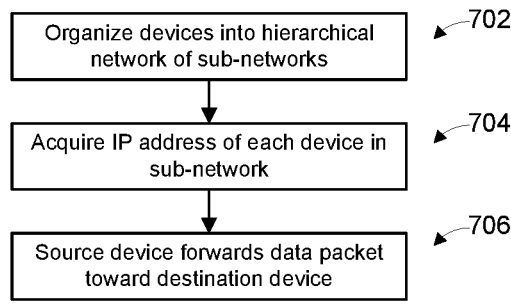
FIGS. 7A-7C illustrate flow diagrams of transmitting data packets in a network in accordance with the disclosed embodiments.
Figure 7B:
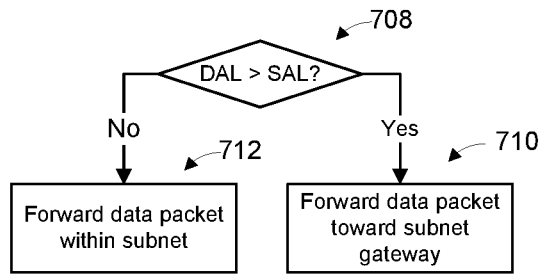
Figure 7C:
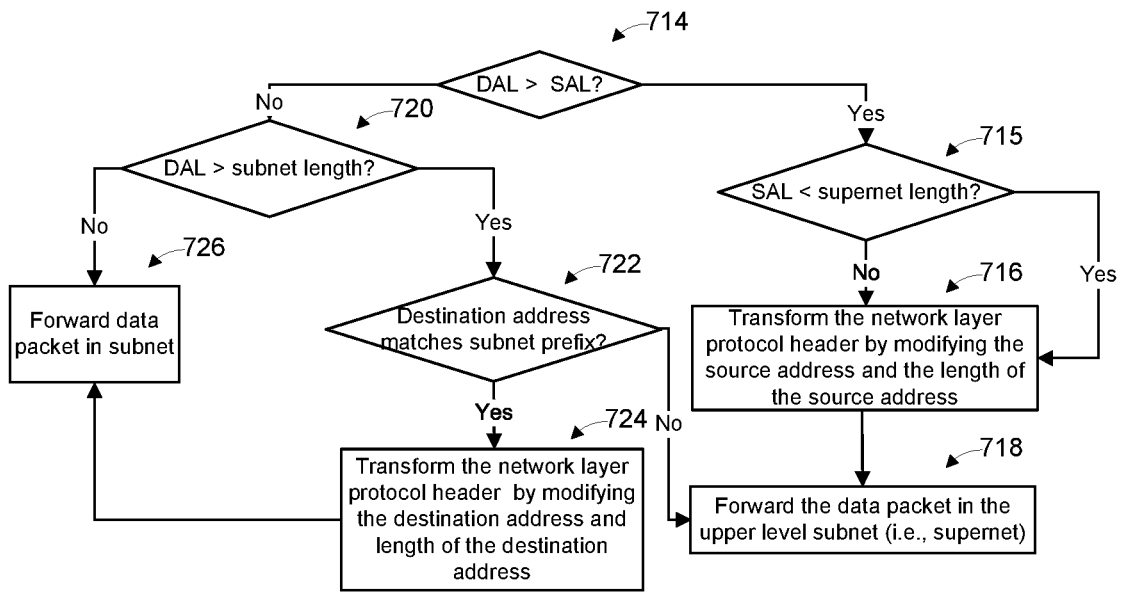

FIGS. 7A-7C illustrate flow diagrams of transmitting data packets in a network in accordance with the disclosed embodiments. In the discussion that follows, the intra-band sub-network router (ISR) or the sub-network gateway router (SGR) perform the procedures. However, it is appreciated that any other functional unit or processing unit may implement the processes described herein, and the disclosure is not limited to implementation by the routers.

As shown in FIG. 7A, entities (or devices) are organized into a hierarchical network of sub-networks at step 702, as described above with reference to FIG. 5. At step 704, the IP address of each device in each sub-network is then acquired, for example, using static or dynamic configurations. When one entity (source entity) wants to communicate with another entity (destination entity), the destination address of the destination entity is acquired by the source entity. The source entity then forwards the data packet toward the destination entity, at step 706. In one embodiment, the data packet is forwarded in the network based on the protocol (e.g., IPvn) and the routing flow (FIG. 7B or 7C). In another embodiment, each entity and router maintains (stores) a forwarding table (e.g., forwarding tables shown in FIGS. 8A and 9A) to determine the data packets next hop based on its destination address or comparison of the address lengths.

FIG. 7B illustrates an example flow of a data packet within a same sub-network performed by an ISR. In this case, if the source and destination entities are in the same sub-network, an ISR checks the IP header of the data packet sent by the source entity. If, at step 708, the ISR determines that the destination address length (DAL) is greater than the source address length (SAL), the data packet is forwarded toward the SGR interfacing with a higher level super-network, at step 710. In one embodiment, the data packet may pass through more than one ISR prior to reaching the SGR. Otherwise, if the DAL is less than or equal to the SAL, the data packet is forwarded to the destination address within the same sub-network at step 712. In either case, the ISR handles forwarding regardless of the actual source or destination address.

FIG. 7C illustrates an example flow of a data packet when source and destination entities are in different sub-networks, performed by an SGR. When the source entity, such as source entity 506a, and the destination entity, such as destination entity 510a, are not in the same sub-network, the full address (i.e., global address) of the destination entity is acquired. This may be accomplished by forwarding the data packet toward the SGR, which will transform the local source address of the source entity when certain conditions are satisfied.

In the discussion that follows, the terminology "super-network" (or "supernet") and "sub-network" (or "subnet") will be used. A super-network as defined herein is a higher level network from the perspective of a particular SGR. A sub-network as defined herein is a lower level network from the perspective of a particular SGR. For example, and with reference to FIG. 5, the super-network of SGR F (508) is the higher level network 505 and the subnet of SFR F (508) is the lower level network 507. Thus, in one embodiment, a data packet may be forwarded toward an SGR from the super-network (e.g., higher level network 505). In another embodiment, the data packet may be forwarded toward the SGR from the sub-network (e.g., lower level network 507). Whether the data packet is received from a super-network or a sub-network of the SGR, along with other factors, will determine how the data packet is processed.

At step 714, upon receipt of the data packet at the SGR, the SGR determines whether the DAL is greater than the SAL. If the DAL is greater than the SAL, the process proceeds to step 715 to determine whether the SAL is less than the next higher level network (the super-network) length. The determination in step 715 identifies whether the data packet being received at the SGR is coming from the SGR's super-network or sub-network. For example, if the SAL is not less than the supernet length, the data packet is arriving from the super-network. If the SAL is less than the supernet length, then the data packet is arriving from the sub-network.

In the first scenario, when SAL is less than the super-network length, the process proceeds to step 716 where the local sub-network address of the source entity is transformed by modifying the source address and the SAL. Within the context of this disclosure, the local sub-network address is any address of a source or destination located within the network having a length appropriate for the sub-network. In this case, modifying the source address and the SAL includes appending to the source address a prefix of the SGR's lower sub-network address. In one embodiment, a prefix of a parent sub-network is appended to the local sub-network address of the packet. In one embodiment, the prefix of a lowest level parent sub-network common to the source and the destination in the network is appended to the local sub-network address of the packet. The data packet is then forwarded to the SGR's higher level network (i.e., the supernet) at step 718.

In a second scenario, when SAL is not less than the supernet length (e.g., SAL=supernet length), the process proceeds to step 718. At step 718, the data packet is forwarded to the SGR's higher level network (i.e., supernet)

without any transformation to the local sub-network address of the source entity. Notably, a transformation is not necessary in this scenario. A detailed example may be found below with reference to FIGS. 9A and 9B.

At step 714, if the router determines that the DAL is less than or equal to the SAL, the process proceeds to step 720 to determine whether the data packet is coming from the SGR's super-network or sub-network. This is accomplished by determining whether the DAL is greater than the sub-network length of the SGR's lower level network. If the DAL is determined to not be greater than the SGR's lower level network's length (for example, if the DAL equals the sub-network length of the SGR's lower level network) at step 720, the data packet is forwarded within the same lower level sub-network (the data packet is arriving from the SGR's subnet) at step 726.

If, at step 720, the DAL is greater than the sub-network length (the data packet is arriving from the SGR's supernet), the destination address is compared to the sub-network prefix to determine whether a match exists, at step 722. If a first portion of the destination address and sub-network prefix match, the destination address is transformed to an address in a next level sub-network by modifying the destination address and the DAL. In this case, modifying the destination address includes removing from the destination address the prefix of the sub-network at step 724. The data packet is then forwarded within the sub-network at step 726. Otherwise, if a first portion of the destination address and sub-network prefix do not match at step 722, the data packet is forwarded to the upper level subnet (i.e., the supernet) at step 718 for continued processing.

Although the flow charts described above detail the overall flow, there are a few exceptional cases that are not illustrated. These exceptions may include, for example, a data packet that includes an illegal SAL or DAL that arrives at a router. For example, if a sub-network's address space is N bytes, and a data packet in the sub-network has an SAL or DAL that is less than N, there is an error. If an error occurs, the packet is dropped.

FIGS. 8A and 8B illustrates example forwarding tables for routing data packets in the network of FIG. 5. The configurations of the sub-networks is shown in forwarding table 800, and the configuration of the hosts are shown in forwarding table 802. In particular, forwarding table 800 is a sub-network forwarding table that stores information about the sub-network (subnet), the length in bytes of the address in the subnet, and the prefix to an upper level subnet (the number after the slash '/' represents the length of the prefix in bits). The forwarding table 802 is a host forwarding table that stores information about the host name, the subnet the host belongs to, and the address of the host in the subnet. In one embodiment, the forwarding tables 800 and 802 may be stored, for example, at entities and routers (including ISRs and SGRs) of the hierarchical network 501.

Figure 9A:
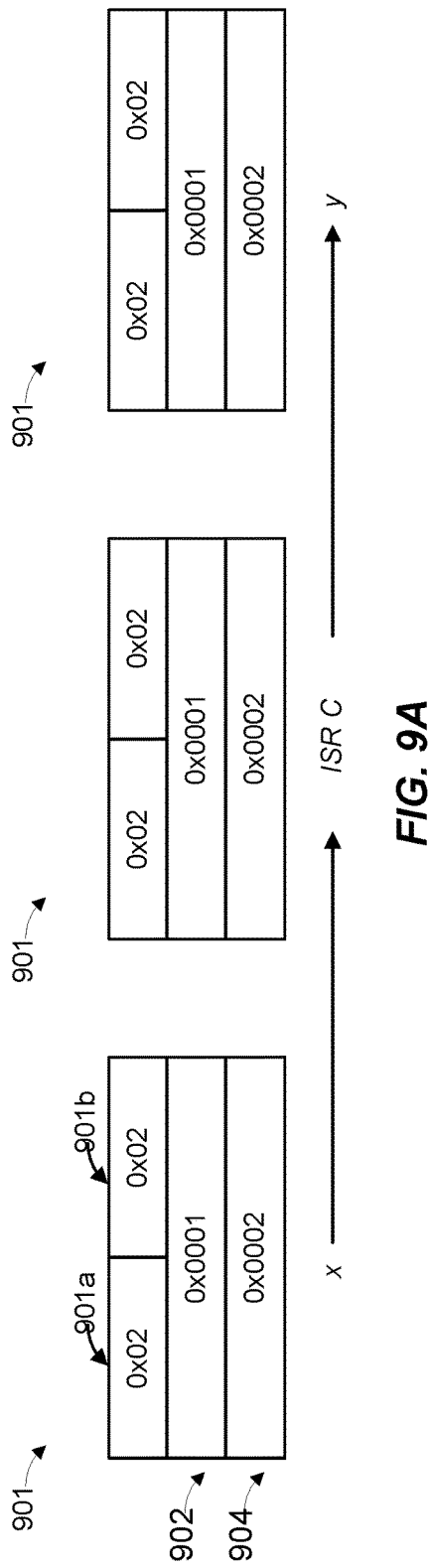
FIG. 9A illustrates an example of routing a data packet between entities in a same sub-network.

FIG. 9A illustrates an example of routing a data packet between entities in same sub-network. In one example, and with reference to FIG. 5, the source entity 506a ("x") in sub-network 505 sends a data packet to the destination entity 506b ("y") in sub-network 505. The data packet initially reaches router 506 ("ISR C") in sub-network 505 using the local source and destination addresses. Since the source and destination entities are in the same sub-network 505, the routing protocol illustrated in FIG. 7B dictates the path of the data packet. In one embodiment, the data packet is routed along the shortest path to the destination entity.

As shown in the figure, only the SAL 901a, DAL 901b, source address 902 and destination address 904 of the IP header, such as IPvn header 312, are shown in the data packet. The SAL 901a, DAL 901b, source address 902 and destination address 904 are collectively referred to herein as the address related fields 901 of the IPvn header 312. For purposes of the example, the SAL 901a and DAL 901b have a fixed length of 8 bits in which to encode the address length in bytes, although any number of bits may be used. As shown in the example, the fixed address lengths are "0x02" for both SAL 901a and DAL 901b, the source address 902 is "0x0001" and the destination address 904 is "0x0002" (also shown in FIG. 5).

Prior to the source entity 506a transmitting a data packet to the destination entity 506b, the source entity 506a acquires the destination entity's local address. Based on the local forwarding tables 800 and 802 (FIGS. 8A and 8B), the data packet (including the address related fields 901) is forwarded within its current sub-network to router 506 ("ISR C"). Upon receipt at the router 506, the DAL 901b is compared to the SAL 901a (step 708).

In one embodiment, if the router 506 determines that the DAL 901b is greater than the SAL 901a, the data packet is forwarded in the direction of the current sub-network's SGR for continued processing (step 710).

In another embodiment, if the router 505 determines that the DAL 901b is not greater than the SAL 901a (i.e., SAL is less than or equals DAL) then the data packet is forwarded within the current sub-network to the destination entity 506b (step 712). In this case, since the SAL and DAL are the same length (i.e., SAL and DAL equal '0x02'), the source entity 506a and the destination entity 506b are in the same sub-network (e.g., sub-network 505). The local addresses may therefore be used to forward the data packet. For example, as shown in FIG. 9A, the data packet is forwarded within sub-network 505 from source entity 'x' at source address 902 ("0x0001") to 'ISR C' to destination entity 'y' at destination address 904 ("0x0002") without any changes to the address related fields 901. Significantly, address space is conserved since only the local addresses are used to forward the data packets between the two entities.

Figure 9B:
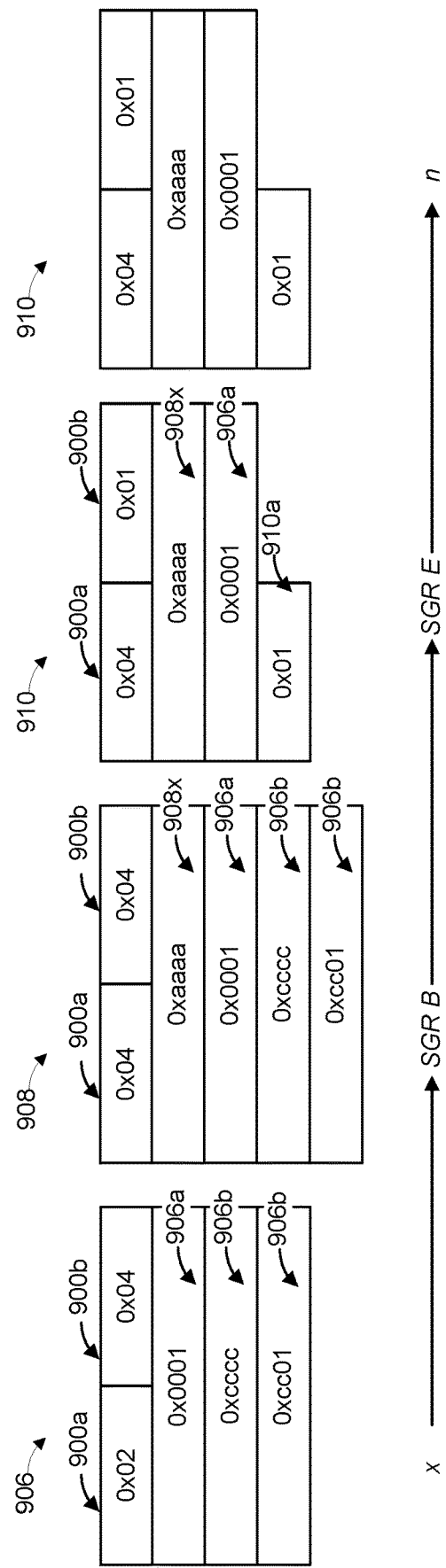
FIG. 9B illustrates an example of routing a data packet between entities in different sub-networks.

FIG. 9B illustrates an example of routing a data packet between entities in different sub-networks. In the illustrated example, and with reference to FIG. 5, the source entity 506a ("x") in sub-network 505 sends a data packet to destination entity 510a ("n") in sub-network 510 using the routing protocol detailed in FIG. 7C. Since the data packet is being forwarded to a destination entity in a different sub-network than the source entity, unlike the example in FIG. 9A, the local address of the destination entity 510a is insufficient for forwarding the data packet. However, the source entity may acquire the destination entity's global address. For example, the destination address may be acquired from a mechanism such as a domain name system (DNS).

Similar to the example of FIG. 9A, only the address related fields of IPvn header 312 are shown. In one embodiment, since the addresses may be transformed during forwarding of the data packets, the address related fields 906 may be modified. The address related fields 906 initially include, for example, the SAL 900a, DAL 900b, source address 906a, and destination address 906b. For purposes of the example, the SAL 900a and DAL 900b have a fixed length of 8 bits in which to encode the address length in bytes, although any number of bits may be used. In this case, the fixed address lengths of the source address and the destination address initially have different lengths (sizes). As shown, the address length for the SAL 900a is "0x02" and the address length for DAL 900b is "0x04," the source address 906*a* is "0x0001" and the destination address 906*b* is "0xcccccc01" (the destination address is twice as long as the source address, as indicated by the SAL and DAL, but the length of the SAL and DAL are fixed and the same). The addresses are also shown in hierarchical network structure of FIG. 5.

In one embodiment, the source entity 506*a* acquires the destination entity's local address prior to forwarding the data packet. Based on the local forwarding tables 800 and 802 (FIGS. 8A and 8B), and the routing protocol of FIG. 7C, the data packet (including the address related fields 906) is forwarded within its current sub-network in the direction of router 504 ("SGR B"). Upon receipt at the router 504, the DAL 901*b* is compared to the SAL 801*a* (step 714).

In one embodiment, the router 504 determines that the DAL 900*b* is greater than the SAL 900*a*. In this case, the source address 906*a* and the SAL 900*a* (length of the source address) are transformed by modifying the source address 906*a* to append a prefix of the lower level parent sub-network, and modifying the SAL 900*a* to be consistent with the new address length (step 716). For example, and with reference to FIG. 5, the prefix 908*x* of the lower level sub-network 505 (as used in the upper level sub-network 503) is "0xaaaa" is appended to modify the source address 906*a*, such that the source address becomes "0xaaaa0001" (i.e., the prefix of the upper level subnet and the original source address). The SAL 900*a* is then modified to be "0x04" (i.e., the length of the modified address). The modified source address (908*x* and 906*a*) and the modified SAL 900*a* are shown in the modified related address fields 908. The data packet, including the modified address related fields 908, may then be forwarded (step 718) in the upper level super-network. In the example, the packet is forwarded to router 510 ("SGR E").

In another embodiment, the DAL 900*b* is not greater than the SAL 900*a*. For example, the modified SAL 900*a* and the DAL 900*b* of the address related fields (address related fields 908) are compared (step 714). Since the modified SAL 900*a* and DAL 900*b* are equal (SAL and DAL equal "0x04" at router 504 ("SGR B")), which means the source entity 506*a* and destination entity 510*a* are in their lowest level common sub-network (i.e., sub-network 503), the process next compares the DAL 900*b* to the current sub-network length (step 720).

In one embodiment, if the comparison results in the DAL 900*b* being equal to sub-network length, then the data packet is forwarded within the sub-network (step 726) and the process is repeated.

In another embodiment, at router 510 ("SGR E"), if the DAL 900*b* is greater than the sub-network length, the destination address is compared to the sub-network prefix. Following the current example, the DAL 900*b* has a length of "0x04" and the sub-network 509 has an address length of 1 (as provided in forwarding table 800). As a result, the prefix of the destination address 906*b* of the modified address related fields 908 is compared to the sub-network address prefix (i.e., the address of sub-network 509) (step 722). For example, the destination address 906*b* "0xcccccc01" in address related fields 908 is compared to the sub-network 509 prefix of router 510 ("SGR E"), which is "0xcccccc."

In one embodiment, if the destination address 906*b* in address related fields 908 does not match the sub-network prefix, the data packet is forwarded to the upper level sub-network (step 718) for continued processing, as described above.

In another embodiment, if the destination address 906*b* in address related fields 908 matches the sub-network prefix, the destination address 906*b* and the DAL 900*b* (length of the destination address) are transformed by modifying the destination address 906*b* by removing the prefix from the transformed local sub-network address, and modifying the DAL 900*b* to be consistent with the new address length (step 724). For example, and with reference to FIG. 5, the prefix 906*b* ("0xcccccc") of the transformed local sub-network address ("0xcccccc01") is removed to modify the destination address 906*b*, such that the destination address 906*b* becomes "0x01" (i.e., the destination address of entity 510*a* in sub-network 509). The DAL 900*b* is then modified to be "0x01" (i.e., the length of the modified address). The modified destination address (910*a*) and the modified DAL 900*b* are shown in the modified related address fields 910. The data packet, including the modified address related fields 910, may then be forwarded (step 726) in the sub-network to the next hop. In the example, the next hop in the sub-network is to router 510 ("SGR E"), which may then be forwarded to entity 510*a* ("n").

Figure 10:
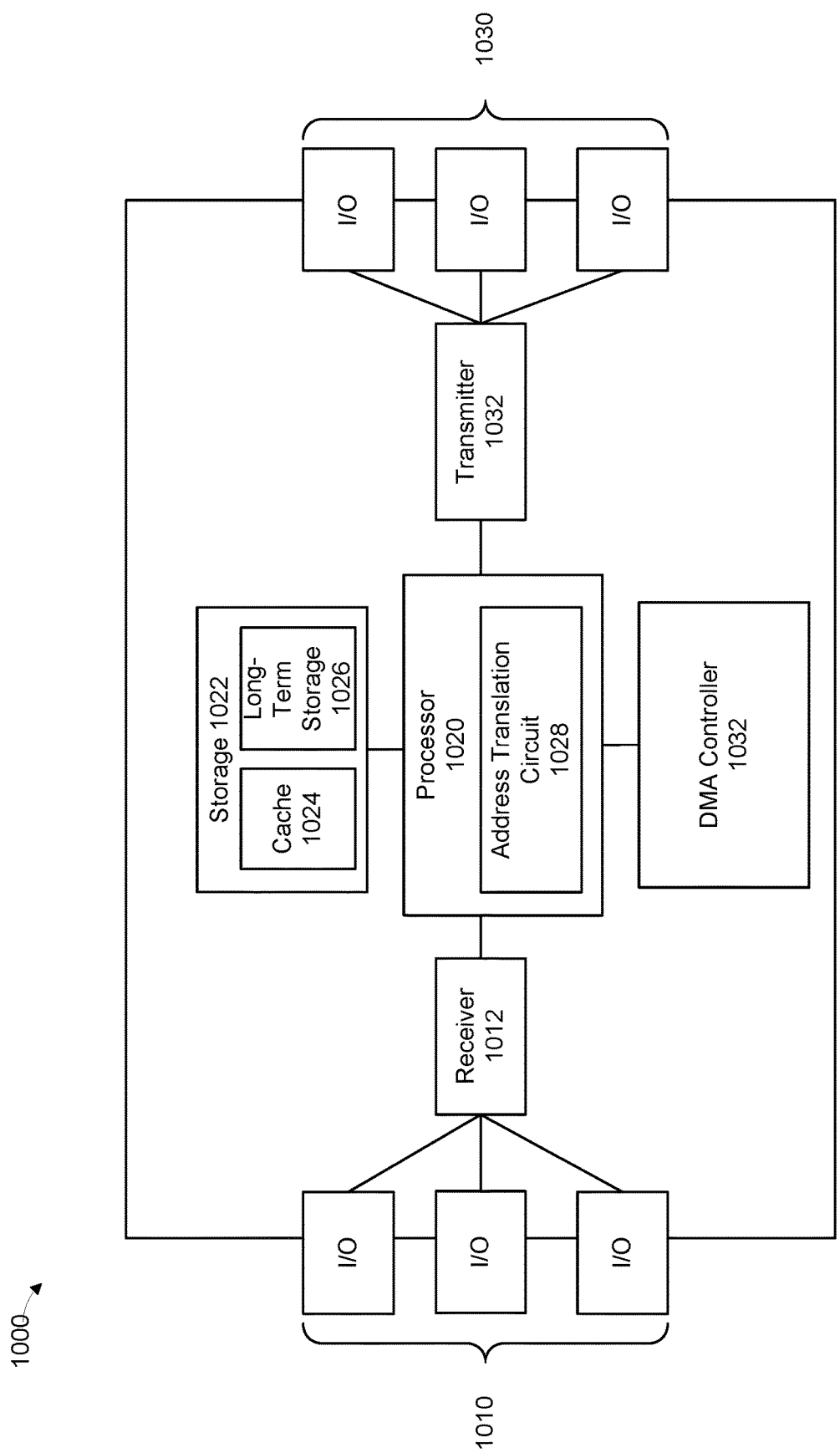
FIG. 10 illustrates an embodiment of a node in accordance with embodiments of the disclosure.

FIG. 10 illustrates an embodiment of a node in accordance with embodiments of the disclosure. The node (e.g., router) may transmit and receive data (e.g., an IP packet) to and from at least one electronic device and/or a server 110, etc., through a network (e.g., global network), such as network 130. The node 1000 may transmit the IP packet, which is received through the network, to another electronic device 110 through a local network. Additionally, the node 100 may transmit an IP packet, which is received from the other electronic device, to the electronic device or the server 110 through the network.

In one embodiment, the node 1000 may comprise a plurality of input/output ports 1010/1030 and/or receivers (Rx) 1012 and transmitters (Tx) 1032 for receiving and transmitting data from other nodes, a processor 1020 including an address translation circuit to process data and determine which node to send the data, storage 1022 including cache 1024 and long-term storage 1026, and a direct memory access (DMA) controller 1032. Although illustrated as a single processor, the processor 1020 is not so limited and may comprise multiple processors. The processor 1020 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1020 may be configured to implement any of the schemes described herein using any one or combination of steps described in the embodiments. Moreover, the processor 1020 may be implemented using hardware, software, or both.

The storage 1022 (or memory) may include cache 1024 and long-term storage 1026, and may be configured to store routing tables, forwarding tables, or other tables or information disclosed herein. Although illustrated as a single storage, storage 1022 may be implemented as a combination of read only memory (ROM), random access memory (RAM), or secondary storage (e.g., one or more disk drives or tape drives used for non-volatile storage of data).

The DMA controller 1032 may support data transmission between the components of the node 1000. In one example embodiment, the DMA controller 500 may control the IP packet to be transmitted among the processor 1020 and the storage 1022. Also, the DMA controller 1032 may transmit a header of an IP packet stored in the memory 1022 to an address translation circuit 1028 of the processor 1020 and/or translate a header translated by the address translation circuit 1028 to the storage 1022.

In one embodiment, a network address of the IP packet, which is received by the node, may be translated or transformed by the address translation circuit 1028 in accordance with embodiments of the disclosure. The IP packet including the translated or transformed network address may be stored in the storage 1022. The processor 1020 may translate or transform the network address of the IP packet to conform to an address system that may be recognized by an electronic device or server 110. Other electronic devices or servers 110 in the network may process the IP packet including the translated or transformed network address. In another embodiment, the processor 1020 may translate or transform the network address of the IP packet to shorten the address and transmit the IP packet including the translated or transformed network address toward a destination device, such as an electronic device or server 110, or another node 1000.

Figure 11:
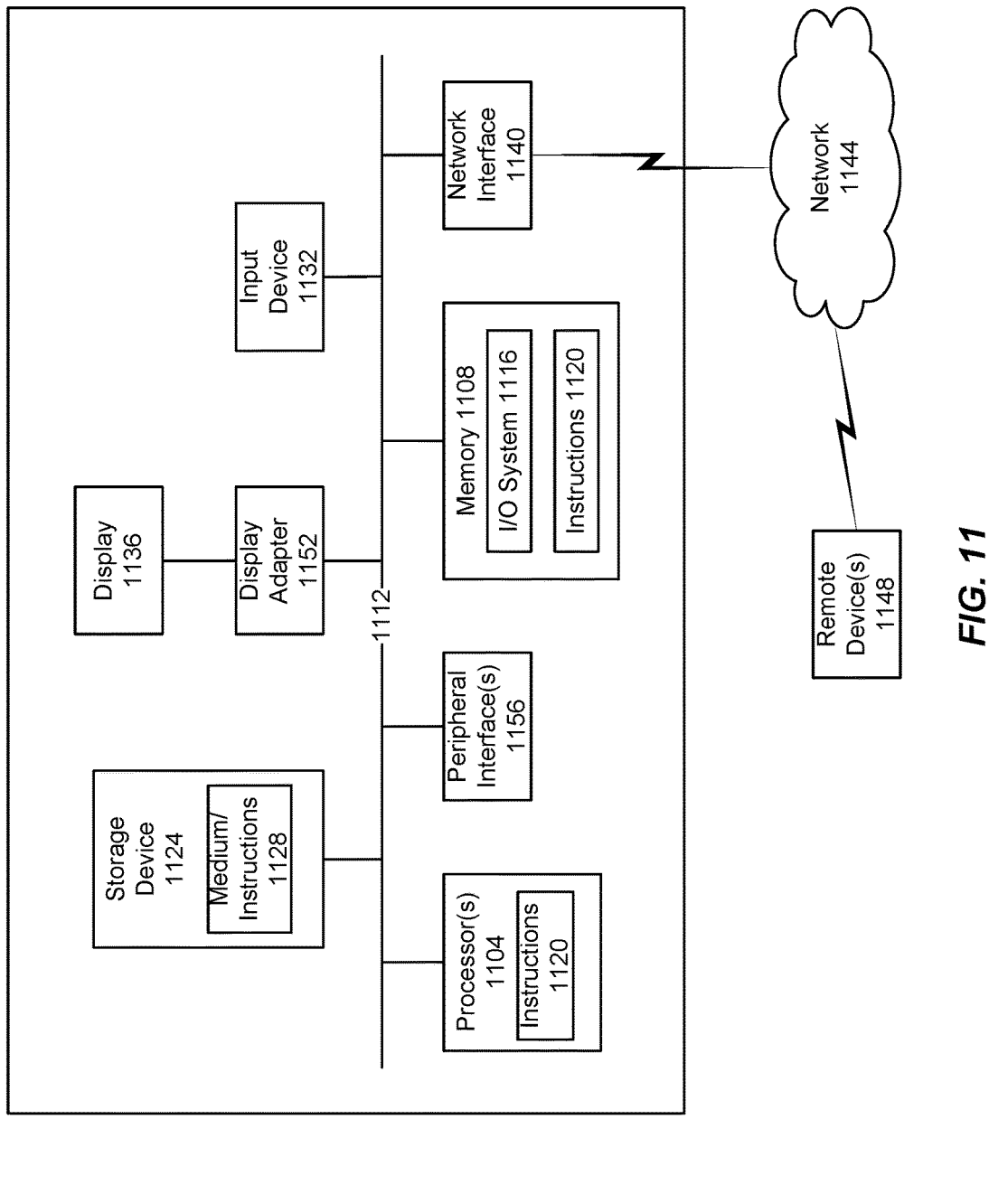
FIG. 11 shows an example embodiment of a computing system for implementing embodiments of the disclosure.

FIG. 11 shows an example embodiment of a computing system for implementing embodiments of the disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Memory 1108 may include various components (e.g., machine-readable media) including, but not limited to, a random access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 700 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for transmitting data packets from a source to a destination within a communications network, comprising:
   receiving a first data packet from the source located in a local sub-network of the network, the first data packet including a first network layer protocol header having a source address containing a local sub-network address of the source, a destination address of the destination, a first field indicating a length of the source address and a second field indicating a length of the destination address;
   transforming the first network layer protocol header by modifying the source address and the first field indicating the length of the source address, the modifying including appending to the local sub-network address a prefix of the sub-network to make the source address an address of a higher level network; and
   forwarding the data packet, including a transformed local-sub-network address, toward the destination in the higher level network.

2. The method of claim 1, further comprising:
   receiving a second data packet with a second local sub-network address of a second source and a second destination address in a second network layer protocol header;
   transforming the second network layer protocol header by modifying the second destination address and a third field indicating the length of the second destination address, the modifying including removing from the second destination address a prefix of the higher level network; and
   forwarding the second data packet, including a transformed destination address, toward the second destination address.

3. The method of claim 2, wherein the first data packet and the second data packet are the same data packet.

4. The method of claim 1, further comprising:
   determining the destination is located outside of the local sub-network of the source when the length of the source address indicated by the first field is less than the length of the destination address indicated by the second field, wherein the transforming and forwarding are in response to the determining.

5. The method of claim 1, wherein the modifying further comprises modifying at least one of the first field indicating the length of the source address and the second field indicating the length of the destination address.

6. The method of claim 1, wherein the communications network includes a plurality of sources and destinations arranged in a nested hierarchical sub-network structure.

7. The method of claim 1, wherein the source address is a local sub-network address used to forward the data packet to the destination address.

8. A router for transmitting data packets from a source to a destination within a communications network, comprising:
a non-transitory memory storage comprising instructions; and
one or more processors in communication with the memory, wherein the one or more processors execute the instructions to:
receive a first data packet from the source located in a local sub-network of the network, the first data packet including a first network layer protocol header having a source address containing a local sub-network address of the source, a destination address of the destination, a first field indicating a length of the source address and a second field indicating a length of the destination address;
transform the first network layer protocol header by modifying the source address and the first field indicating the length of the source address, the modifying including appending to the local sub-network address a prefix of the sub-network to make the source address an address of a higher level network; and
forward the data packet, including a transformed local-sub-network address, toward the destination in the higher level network.

9. The router of claim 8, wherein the one or more processors further execute the instructions to:
receive a second data packet with a second local sub-network address of a second source and a second destination address in a second network layer protocol header;
transform the second network layer protocol header by modifying the second destination address and a third field indicating the length of the second destination address, the modifying including removing from the second destination address a prefix of the higher level network; and
forward the second data packet, including a transformed destination address, toward the second destination address in the higher level network.

10. The router of claim 9, wherein the first data packet and the second data packet are the same data packet.

11. The router of claim 8, wherein the one or more processors further execute the instructions to determine the destination is located outside of the local sub-network of the source when the length of the source address indicated by the first field is less than the length of the destination address indicated by the second field, wherein the transform and forward steps are in response to the determine step.

12. The router of claim 8, wherein the communications network includes a plurality of sources and destinations arranged in a nested hierarchical sub-network structure.

13. The router of claim 8, wherein the source address and the destination addresses of each device is one of statically or dynamically configured.

14. The router of claim 8, wherein the source address is a local sub-network address used to forward the data packet to the destination address.

15. A non-transitory computer-readable medium storing computer instructions for transmitting data packets from a source to a destination within a communications network, that when executed by one or more processors, cause the one or more processors to perform the steps of:
receiving a data packet from the source located in a local sub-network of the network, the data packet including a first network layer protocol header having a source address containing a local sub-network address of the source, a destination address of the destination, a first field indicating a length of the source address and a second field indicating a length of the destination address;
transforming the first network later protocol header by modifying the source address and the first field indicating the length of the source address, the modifying including appending to the local sub-network address a prefix of the sub-network to make the source address an address of a higher level network; and
forwarding the data packet, including a transformed local-sub-network address, toward the destination in the higher level network.

16. The non-transitory computer-readable medium of claim 15, wherein the one or more processors further perform the steps of:
receiving a second data packet with a second local sub-network address of a second source and a second destination address in a second network layer protocol header;
transforming the second network layer protocol header by modifying the second destination address and a third field indicating the length of the second destination address, the modifying including removing from the second destination address a prefix of the higher level network; and
forwarding the second data packet, including a transformed destination address, toward the second destination address.

17. The non-transitory computer-readable medium of claim 15, wherein the one or more processors further perform a step of determining the destination is located outside of the local sub-network of the source when the length of the source address indicated by the first field is less than the length of the destination address indicated by the second field, wherein the transforming and forwarding steps are in response to the determining step.

18. The non-transitory computer-readable medium of claim 15, further comprising modifying at least one of the first field indicating the length of the source address and the second field indicating the length of the destination address.

19. The non-transitory computer-readable medium of claim 15, wherein the communications network includes a plurality of sources and destinations arranged in a nested hierarchical sub-network structure.

20. The non-transitory computer-readable medium of claim 15, wherein the source address is a local sub-network address used to forward the data packet to the destination address.

* * * * *